(12) United States Patent
Wolf

(10) Patent No.: US 8,348,421 B2
(45) Date of Patent: Jan. 8, 2013

(54) SPECTACLES

(75) Inventor: Roland Wolf, Tirol (AT)

(73) Assignee: Rolf Spectacles Rolf-Roland Wolf GmbH, Tirol (AT)

( * ) Notice: Subject to any disclaimer, the term of this patent is extended or adjusted under 35 U.S.C. 154(b) by 417 days.

(21) Appl. No.: 12/689,901

(22) Filed: Jan. 19, 2010

(65) Prior Publication Data

US 2011/0019146 A1 Jan. 27, 2011

(30) Foreign Application Priority Data

Jul. 21, 2009 (DE) .................. 20 2009 009 918 U

(51) Int. Cl.
*G02C 1/00* (2006.01)

(52) U.S. Cl. ........................................... 351/86; 351/83

(58) Field of Classification Search .................... 351/86, 351/83, 41, 92, 90, 95
See application file for complete search history.

(56) References Cited

U.S. PATENT DOCUMENTS

| | | | | |
|---|---|---|---|---|
| 1,659,165 A * | 2/1928 | Sangren | ........................ | 351/86 |
| 5,288,533 A * | 2/1994 | Remick, II | ...................... | 428/45 |
| 5,400,089 A * | 3/1995 | Danloup et al. | ................ | 351/92 |
| 6,074,059 A * | 6/2000 | Glass et al. | ..................... | 351/86 |
| 6,971,745 B2 * | 12/2005 | Sheldon | ........................ | 351/86 |

* cited by examiner

*Primary Examiner* — Hung Dang

(74) *Attorney, Agent, or Firm* — Foley & Lardner LLP

(57) ABSTRACT

The present invention relates to spectacles comprising a spectacle frame and a spectacle glass. The spectacle frame, in turn, comprises a frame which defines a receiving opening for the spectacle glass and essentially completely borders the spectacle glass. The spectacle glass is fixed in the receiving opening by means of a thread inserted between the frame defining the receiving opening and the edge of the spectacle glass.

33 Claims, 2 Drawing Sheets

SPECTACLES

BACKGROUND

The present application relates to a spectacle frame, a special fixing thread for fixing a spectacle glass or lens in a spectacle frame as well as to spectacles.

Spectacles normally consist of a spectacle frame comprising bows or arms and two ground or cast spectacle glasses, which as a rule serve as visual aid or for protecting the eyes. The spectacle frame is often made of a synthetic material or metal. However, also other materials are used.

The spectacle glasses must be reliably fixed in the spectacle frame. There are various conventional ways for achieving this. On the one hand, there are spectacle frames which consist of two parts and can be opened or bent open so that the spectacle glasses can be inserted. Then, the spectacle frames consisting of two parts are screwed together in order to guarantee that the spectacle glasses are reliably fixed in the spectacle frame. If the spectacle frame consists of one part, the frame is expanded by means of heat so that the glasses can be received therein. However, this method is only possible if sufficiently expandable materials are used, in particular synthetic materials/plastics and some metals. However, wood and aluminum cannot be sufficiently expanded. For aesthetic reasons, however, it can also be necessary to manufacture a one-part spectacle frame also from, e.g., wood or aluminum. In accordance with conventional methods this is not possible or only possible with great difficulties.

SUMMARY

Accordingly, it is an object of the present invention to provide an alternative way of fixing spectacle glasses in spectacle frames. In particular, an improved spectacle frame for reliably receiving spectacle glasses therein as well as spectacles in which the glasses have already been mounted are provided. Further objects are the provision of an improved spectacle frame in which spectacle glasses can be inserted in a cost-efficient manner, as well as in particular improved one-part spectacles which are preferably made of wood or aluminum and in which the spectacle glasses are reliably received.

These objects are achieved with the features of the independent claims. Preferred embodiments of the invention are described in the dependent claims.

According to a first aspect, the present invention relates to spectacles comprising a spectacle frame and a spectacle glass, wherein the spectacle frame comprises a frame which defines a receiving opening for the spectacle glass and essentially completely surrounds the spectacle glass. The spectacle glass is fixed in the receiving opening by means of a thread inserted between the frame defining the receiving opening and the edge of the spectacle glass. The spectacles of the present invention differ from already known spectacles in which a part of the spectacle frame is formed by a thread. In these known spectacles, the frame defining the receiving opening is partially interrupted and replaced by a thread holding the glass in the opening. In contrast thereto, in the spectacles of the present invention the frame defining the receiving opening extends essentially completely around the edge of the spectacle glass, wherein in particular a completely closed circumferential shape is preferred. According to the present invention, the thread extends between the edge of the spectacle glass and the inner edge of the frame forming the receiving opening for the spectacle glass. Without thread, the spectacle glass rests more or less loosely in the receiving opening of the frame, whereas the spectacle glass is reliably fixed in the receiving opening in case a thread is present.

According to a first alternative of the present invention, the spectacles comprise two spectacle glasses and the spectacle frame comprises two receiving openings for the spectacle glasses, wherein the two spectacle glasses are fixed in the receiving opening by means of one and the same thread. In other words, the thread is sufficiently long to extend between the edge of the first spectacle glass and the frame portion defining the first receiving opening and also between the edge of the second spectacle glass and the frame portion defining the second receiving opening. In accordance with this first alternative, fitting in the spectacle glasses is particularly easy because only one thread has to be inserted into the spectacle frame for fixing the glasses.

According to a second alternative, the spectacles also comprise two spectacle glasses and the spectacle frame comprises two receiving openings for the spectacle glasses, wherein the two spectacle glasses are fixed in the receiving openings by means of a respective separate thread. Depending on the shape of the spectacle frame, this can be advantageous because the thread then does not have to be guided from one receiving opening to the next receiving opening.

According to a preferred embodiment of the present invention, the frame defining the receiving opening comprises a groove which is directed towards the receiving opening and in which the thread is guided. Optionally or alternatively, also the edge of the spectacle glass comprises a corresponding groove. Inserting the thread into this/these (two) groove(s) prevents the spectacle glass from moving in or falling out of the spectacle frame. Preferably, the thread has a diameter being minimally larger than the groove, so that the thread clamps the spectacle glass in the spectacle frame.

Moreover, the spectacle frame preferably comprises at least two bores through which the thread is guided. Preferably, the two bores are provided at the outer edges of the spectacle frame where the bows of the spectacle frame are arranged at the remaining frame. In accordance with the above-mentioned first alternative, it is preferred that the spectacle frame comprises two bores at the outer edges of the spectacle frame as well as a nosepiece or bridge which also comprises a (third) bore through which the thread is guided. Thus, one and the same thread can be inserted at an outer edge in the spectacle frame and guided through the groove between the edge of the first spectacle glass and the first portion of the frame defining the first receiving opening to the bore in the nosepiece, through this bore, through the groove between the edge of the second spectacle glass and the second frame portion defining the second receiving opening, and through and out of the second bore at the other outer edge. To this end, the bore in the nosepiece preferably adjoins the groove or grooves in the frame.

In accordance with the above second alternative according to which each spectacle glass is fixed by means of its own thread, the spectacle frame preferably comprises four bores, i.e. two for each spectacle glass. These bores can be provided, e.g., at an outer edge and below or above the nosepiece.

For mounting the spectacle glass more stably in the spectacle frame, it is further preferred that the frame defining the receiving opening comprises a bar which is directed towards the receiving opening and comes in engagement with a groove in the edge of the spectacle glass. Thus, the spectacle glass is fixed in a first edge portion by means of bar and groove, whereas in a second portion it is fixed by means of groove and thread. Preferably, these portions lie approximately opposite to one another. For example, it is possible to fix the upper edge of the spectacle glass by means of groove and thread, whereas the lower edge of the spectacle glass is fixed by means of groove and bar. The bar can also be divided once or several times, or a plurality of little bars can be provided.

According to a further aspect of the present invention, spectacles comprising a spectacle frame, a spectacle glass and a fixing thread are provided, said fixing thread being inserted between the spectacle frame and the edge of the spectacle glass in such a manner that the spectacle glass is clamped in the spectacle frame. In accordance with the two alternatives of the first aspect described above, also the spectacles according to the second aspect can comprise two spectacle glasses which are clamped in the spectacle frame by means of one and the same thread. Alternatively, the spectacles can comprise two spectacle glasses and two fixing threads which are each inserted between the spectacle frame and the edges of the spectacle glasses in such a manner that the spectacle glasses are clamped in the spectacle frame by one fixing thread each.

Preferably, the spectacle frame comprises a groove in which the fixing thread is guided. Moreover, the spectacle frame preferably comprises two bores through which the fixing thread is guided. Moreover, a further (third) bore, through which the fixing thread is guided, can be provided in the nosepiece of the spectacles. Preferably, the bore in the nosepiece adjoins the groove or grooves in the spectacle frame. Furthermore, the spectacle frame preferably comprises a bar which comes in engagement with a groove in the edge of the spectacle glass. As described above, the bar can have a plurality of interruptions, or a plurality of little bars can be provided. In general, the statements made above in view of the first aspect also apply to the second aspect of the present invention.

Also the following preferred features can be provided at both the spectacles according to the first aspect and the spectacles according to the second aspect.

Preferably, the thread is between 1 cm and 25 cm, particularly preferably between 3 cm and 20 cm long. The thread preferably has a diameter between 0.1 mm and 3 mm, particularly preferably between 0.5 mm and 1.5 mm. The thread preferably consists of one or a combination of the following materials: monofilament and braided polymers such as polyamide, polyester, polyurethane and fluorocarbon. The spectacle frame preferably comprises a synthetic material, plastics, metal, aluminum, wood, titanium, carbon, horn or a combination thereof. The present invention comes to its fullest advantage, however, in case the spectacle frame is made of a non-expandable or only poorly expandable material. Thus, spectacles comprising spectacle frames of wood, horn, carbon or aluminum are particularly preferred.

According to a further aspect, the present invention provides a fixing thread for fixing the spectacle glass in a spectacle frame. The fixing thread comprises a first portion and a second portion, wherein the diameter of the thread in the first portion is larger than the diameter of the thread in the second portion. Preferably, the diameter of the thread in the first portion is larger by at least 1.5 times, particularly preferably by at least two times than the diameter of the thread in the second portion.

In accordance with a preferred embodiment of the fixing thread, the first portion and the second portion have essentially the same length. However, the two portions can also have different lengths. In particular, the first portion of the fixing thread can be longer than the second portion of the fixing thread, for example it can have twice the length of the second portion. The length of the entire thread lies preferably between 2 cm and 50 cm, particularly preferably between 6 cm and 40 cm. In the first portion, the thread preferably has a diameter between 0.1 mm and 3 mm, particularly preferably between 0.5 mm and 1.5 mm. In the second portion, the diameter of the thread preferably lies between 0.05 mm and 2 mm, particularly preferably between 0.2 mm and 1 mm. In accordance with a preferred embodiment, the thread is made of one or a combination of the following materials: monofilament and braided polymers such as polyamide, polyester, polyurethane and fluorocarbon.

According to a further aspect of the present invention, a spectacle frame made of wood, horn, carbon or aluminum is provided, which comprises two receiving openings for spectacle glasses, wherein the spectacle frame comprises a groove and a bar, which are both directed towards the receiving openings, for each spectacle glass, and wherein further at least two bores are provided for guiding a fixing thread through them.

Finally, the present invention provides a kit. The latter comprises a spectacle frame, in particular a spectacle frame as described above, and at least one fixing wire as described above.

BRIEF DESCRIPTION OF DRAWINGS

In the following, preferred embodiments of the invention will be described in more detail on the basis of the Figures in which.

DETAILED DESCRIPTION

Figure 1:
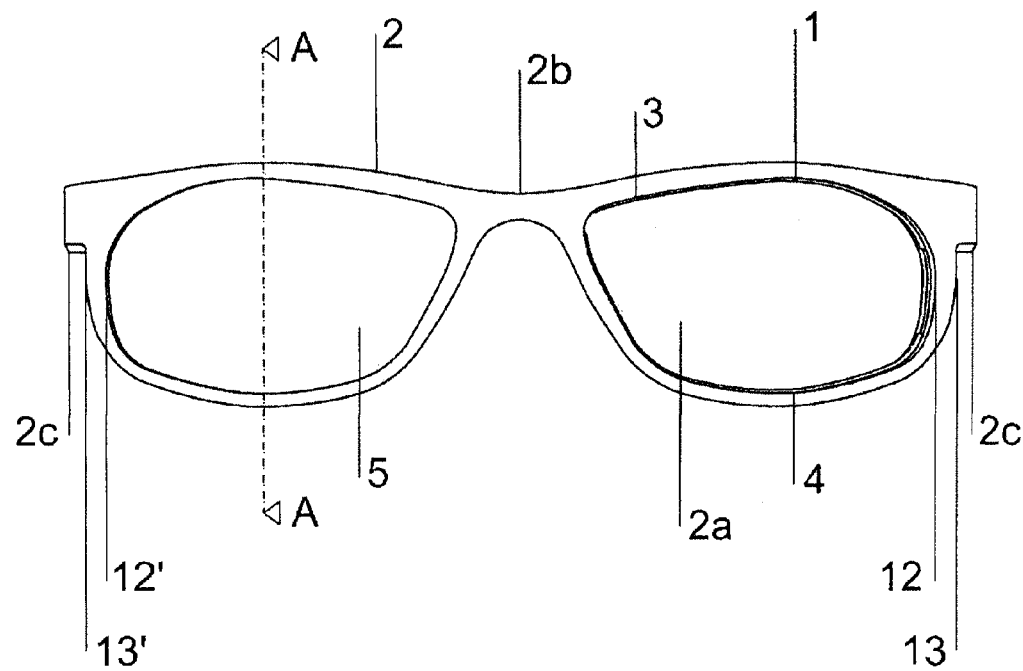
FIG. 1 shows a front view of a spectacle frame according to the invention.

FIG. 1 shows a front view of a preferred embodiment of a spectacle frame 2 according to the invention. The spectacle frame 2 comprises two frame parts, each completely enclosing or bordering a receiving opening 2a for a spectacle glass 5. In the Figure, the right receiving opening 2a is left free while a spectacle glass 5 is inserted into the left receiving opening 2a. The two regions of the spectacle frame 2 defining a receiving opening are connected with each other by a nosepiece or bridge 2b. Bows 2c, which are only indicated, are arranged at the outer edges 13 and 13'.

At the lower edge of each receiving opening 2a, the spectacle frame 2 comprises a bar 4 which comes in engagement with a groove in the spectacle glass 5. At the upper edge of the receiving opening 2a, the frame of the spectacle frame 2 comprises a groove 3 being directed towards the receiving opening 2a. A thread 1 extends through this groove 3.

Figure 2:
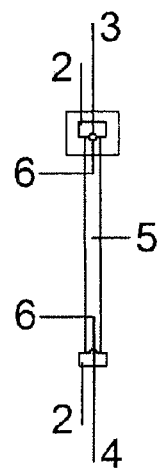
FIG. 2 shows a sectional view through the spectacle frame according to the invention as shown in FIG. 1 along the line A-A.
Figure 3A:
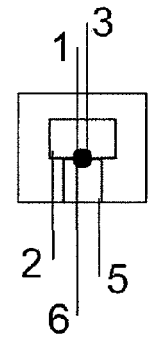
FIG. 3a shows a detail of the sectional view of FIG. 2.
Figure 3B:
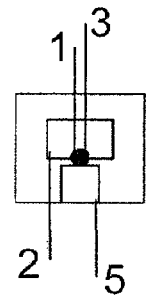
FIG. 3b shows like FIG. 3a a detailed view of an alternative embodiment according to the invention.

FIG. 2 shows a sectional view of FIG. 1 along line A-A. At its top and its bottom, the spectacle glass 5 is bordered by the spectacle frame 2. This border or frame of the spectacle frame 2 comprises at its lower edge a bar 4 which comes in engagement with a groove 6 in the edge of the spectacle glass 5. At its upper edge, the spectacle frame 2 comprises a groove 3 which is flush with a groove 6 in the edge of the spectacle glass 5. This is more clearly visible in the detailed view of FIG. 3a. A thread 1 extends through the groove 3 in the spectacle frame 2 and the groove 6 in the edge of the spectacle glass 5. Because of the presence of the thread 1, the spectacle glass 5 is stabilized or fixed in the receiving opening 2*a* of the spectacle frame 2. The spectacle glass 5 is thus prevented from moving in or falling out of the spectacle frame 2. According to an alternative embodiment (see FIG. 3*b*), only the spectacle frame 2 comprises a groove 3. In this embodiment, the groove 6 in the edge of the spectacle glass 5 is not necessary. In accordance with this embodiment, the glass 5 is held in the spectacle frame 2 in that the thread 1 has just such a diameter that the spectacle glass 5 is clamped in the receiving opening 2*a* of the spectacle frame 2. The spectacle glass 5 is thus fixed in the spectacle frame 2 in particular by frictional forces.

Figure 4:
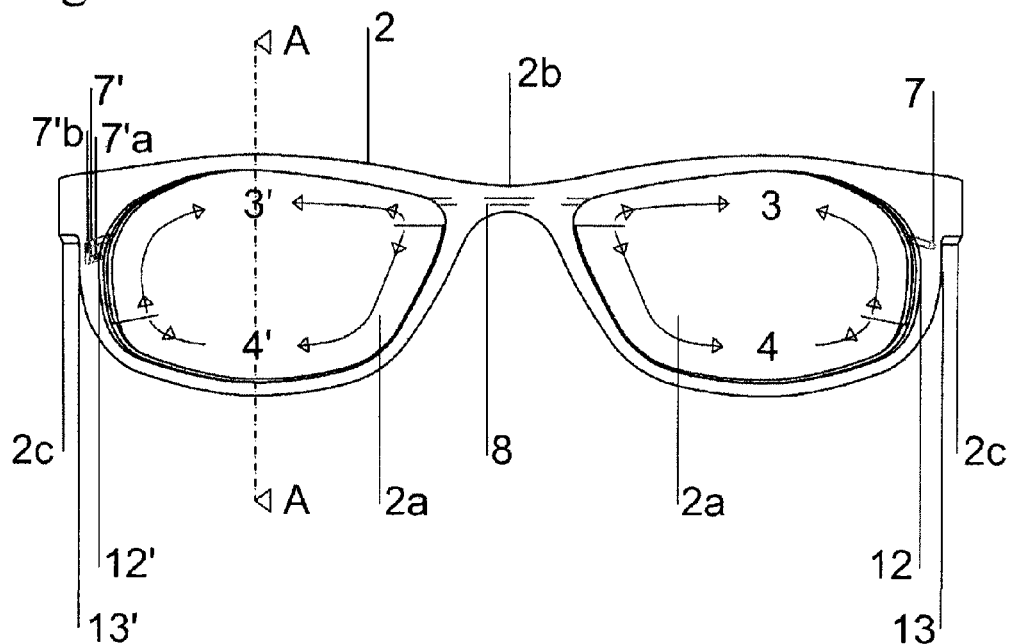
FIG. 4 shows a schematic front view of a spectacle frame according to the invention.

FIG. 4 shows a further preferred embodiment of the spectacle frame or spectacles according to the invention. The spectacle frame 2 is structured similar to the spectacle frame of FIG. 1. However, it additionally comprises bores 7, 7' between the inner edge 12, 12' and the outer edge 13, 13'. Moreover, the spectacle frame 2 of FIG. 4 comprises a bore 8 in the nosepiece or bridge 2*b*. As will be described in the following, these bores serve for inserting the thread 1 for fixing the spectacle glasses 5. FIG. 4 further indicates an exemplary arrangement of the grooves 3 and 3' as well as the bars 4 and 4'. According to this Figure, the spectacle frame 2 comprises, extending from the nosepiece 2*b*, bars 4 and 4' at the lower half of the regions forming the receiving openings 2*a*. The remaining bordering of the receiving opening 2*a* is provided with a groove 3, 3'. This arrangement, however, is of course only an example. For example, groove and bar do not have to adjoin each other directly. Moreover, the regions in which a groove or a bar is provided can be clearly smaller than shown in FIG. 4. The bar 4 can also be interrupted or a plurality of small bars can be provided. In particular, also only two or three contact points can be provided, which come in engagement with the spectacles 6 in the edge of the spectacle glass 5.

Also the arrangement of the bores 7, 7' and 8 is exemplary. While in the shown embodiment the bore 7 exits at the outer edge 13 slightly below the bow 2*c*, it is also possible that the bore 7 is provided, e.g., clearly higher and its outlet opening is covered by the bow 2*c*.

Figure 5:
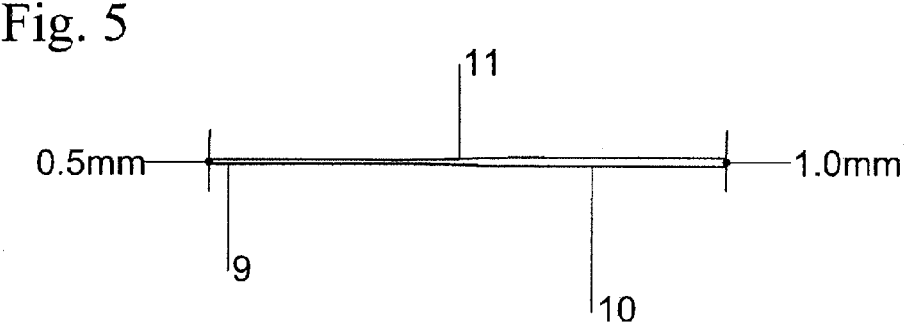
FIG. 5 shows a thread according to the invention.

FIG. 5 shows a preferred embodiment of the fixing thread 1 according to the invention. The fixing thread 1 comprises a first portion 10 and a second portion 9, which are separated from each other by a taper 11. In the preferred embodiment shown, the diameter of the fixing thread is 1.0 mm in the first portion 10, while in the second portion 9 the diameter is 0.5 mm. In this embodiment, the two portions essentially have the same length. However, the first portion 10 can be clearly longer than the second portion 9. For example, the first portion can have twice the length of the second portion.

In the following it will be described how the spectacle glasses 5 are fixed in the spectacle frame 2 according to the invention. First, the spectacle glasses 5 are shaped by using a pre-fabricated former or by scanning a support glass, then provided with a flat side at the side edges, and subsequently provided all around with grooves. In this manner, glasses are also prepared for glazing metal frames or semi-frames.

Starting with its tapered end, i.e. starting with the second portion 9, the thread 1 is guided through the bores 7, 8 and 7'. Between the bores, the thread 1 comes to lie in the groove 3, 3'. In the second portion 9, the thread 1 is just so thin that it is essentially received completely in the groove 3. The length of the thread extends in the tapering region 9 at least along the length of a frame half and in the first portion 10 along at least the overall length of the spectacle frame 2. The grooves 3 and 3' are shaped such that the first portion 10 of the thread 1 fits maximally halfway into the grooves 3 and 3'.

The spectacle glasses 5 are now inserted such into the receiving openings 2*a* of the spectacle frames 2 that the bars 4, 4' come in engagement with the groove 6 in the edge of the spectacle glasses 5. On the opposite side of the spectacle glass, the edge of the spectacle glass can slide along the thread 1 without resistance because the thread 1 is received completely in the grooves 3, 3'. If the fixing thread 1 is guided further through the bores 7, 8 and 7', the first portion of the thread having the larger diameter is inserted into the grooves 3, 3'. Since in this first portion of the fixing thread is so thick that it fits maximally halfway into the grooves 3, 3', the fixing thread 1 exerts a force on the edges of the spectacle glasses 5 and clamps them in the receiving opening 2*a* of the spectacle frame 2. Alternatively, the portion of the fixing thread 1 projecting from the grooves 3, 3' comes to lie in the groove 6 provided in the spectacle glasses 5. The spectacle glasses 5 now rest firmly in the spectacle frame 2, and the spectacle glasses 5 are prevented from moving in or falling out of the spectacle frame. The ends of the fixing thread 1 projecting from the bores 7 and 7' are cut off.

Figure 4A:
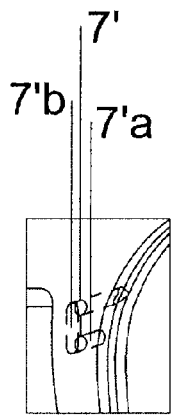
FIG. 4a shows a detailed view of a feature of FIG. 4.

Optionally, the bores 7 and 7' can be closed at their ends so that the thread is no longer visible after mounting. A further variant (see FIG. 4*a*) is provided by a second, non-continuous bore 7'*a* close to the bore 7'. This second bore 7'*a* is connected by a groove 7'*b* with the bore 7', whose diameter corresponds at least to the diameter of the thread, so that the fixing thread 1 is not obviously visible from outside. Thus, the fixing thread 1 can project 3 mm to 5 mm from the bore 7', and its projecting end can be hidden in the second, non-continuous bore 7'*a* by inserting it therein. When changing a glass, the projecting end can be released easily from the second, non-continuous bore and the fixing thread 1 can be removed easily.

In other words, the fixing thread 1 acts to some extent as an elongate wedge which clamps the spectacle glasses 5 in the receiving openings 2*a* of the spectacle frame 2. For being able to fulfill this function, the material from which the fixing thread is made should not be too elastic. However, a certain deformability is advantageous because this guarantees that a uniform force is exerted on the edge of the spectacle glasses. Preferred materials for the fixing thread are: monofilament and braided polymers such as polyamide, polyester, polyurethane and fluorocarbon.

It goes without saying that the wedge-shaped fixing thread can also be used in other embodiments different from that shown in FIG. 4. In particular, an own fixing thread 1 can be provided for each spectacle glass 5. For example, this can be realized in that the bore 8 in the nosepiece 2*b* is replaced by two smaller bores providing the nosepiece 2*b* with outlet openings for a single fixing thread.

The glazing system according to the present invention offers a plurality of advantages. First, before inserting the glasses, the frame does not have to be heated or separated. In particular separating the frame causes disturbance in the material and in the design of the frame, which is often not desired for aesthetic reasons. Moreover, a frame that is closed all around and does not have to be screwed increases stability. Also in view of durability and the period the spectacles are maintenance-free, it might be advantageous to use only a thread instead of closing blocks or screws. The fixing thread according to the present invention allows spectacle glasses to be fitted in spectacle frames easily and in a cost-efficient manner. To this end, i.a. also standard spectacle glasses can be used. The use of the fixing thread according to the present invention offers itself in particular in view of wood, aluminum, titan, horn, carbon and unexpandable synthetic materials but is not restricted thereto.

The invention claimed is:

1. Spectacles comprising:
a spectacle frame; and
a spectacle glass,
wherein the spectacle frame comprises a receiving opening frame including a receiving opening for the spectacle glass and essentially completely borders the spectacle glass, and
wherein the spectacle glass is fixed in the receiving opening by a thread inserted between the receiving opening frame and an edge of the spectacle glass,
wherein the receiving opening frame comprises a first groove directed towards the receiving opening and in which the thread is guided,
wherein the edge of the spectacle glass comprises a second groove in which the thread is guided, and
wherein the thread is completely received in the first groove and the second groove.

2. The spectacles according to claim 1, further comprising two spectacle glasses, wherein the spectacle frame further comprises two receiving openings for the two spectacle glasses, and wherein the two spectacle glasses are fixed in the two receiving openings by one thread.

3. The spectacles according to claim 1, further comprising two spectacle glasses, wherein the spectacle frame further comprises two receiving openings for the two spectacle glasses, and wherein each of the two spectacle glasses are fixed in the two receiving openings by the thread.

4. The spectacles according to claim 1, wherein the spectacle frame further comprises two bores through which the thread is guided.

5. The spectacles according to claim 1, further comprising a nosepiece comprising a bore through which the thread is guided.

6. The spectacles according to claim 5, wherein the bore in the nosepiece adjoins the first groove.

7. The spectacles according to claim 1, wherein the receiving opening frame further comprises a bar directed towards the receiving opening and configured to engage the second groove.

8. The spectacles according to claim 1, wherein the receiving opening frame further comprises at least one of a subdivided bar and a plurality of separate bars configured to engage the second groove.

9. The spectacles according to claim 1, wherein the thread is between 1 cm and 25 cm, preferably between 3 cm and 20 cm long.

10. The spectacles according to claim 1, wherein the thread has a diameter between 0.1 mm and 3 mm, preferably between 0.5 mm and 1.5 mm.

11. The spectacles according to claim 1, wherein the thread is made of at least one of monofilament and braided polymers such as at least one of polyamide, polyester, polyurethane and fluorocarbon.

12. The spectacles according to claim 1, wherein the spectacle frame further comprises a synthetic material, plastics, metal, aluminum, wood, titan, carbon, horn or a combination thereof.

13. Spectacles comprising:
a spectacle frame;
a spectacle glass; and
a fixing thread inserted between the spectacle frame and an edge of the spectacle glass in such a manner that the spectacle glass is clamped in the spectacle frame,
wherein the spectacle frame comprises a first groove in which the fixing thread is guided,
wherein the edge of the spectacle glass comprises a second groove in the which the fixing thread is guided, and
wherein the fixing thread is completely received in the first groove and the second groove.

14. The spectacles according to claim 13, further comprising two spectacle glasses, wherein the two spectacle glasses and the fixing thread is are inserted between the spectacle frame and edges of the two spectacle glasses in such a manner that the two spectacle glasses are clamped in the spectacle frame.

15. The spectacles according to claim 13, further comprising two spectacle glasses and two fixing threads which are each inserted between the spectacle frame and edges of the two spectacle glasses in such a manner that the two spectacle glasses are clamped in the spectacle frame.

16. The spectacles according to claim 13, wherein the spectacle frame further comprises two bores through which the fixing thread is guided.

17. The spectacles according to claim 13, further comprising a nosepiece comprising a bore through which the fixing thread is guided.

18. The spectacles according to claim 17, wherein the bore adjoins the first groove.

19. The spectacles according to claim 13, wherein the spectacle frame further comprises a bar configured to engage the second groove.

20. The spectacles according to claim 13, wherein the spectacle frame further comprises a plurality of bars configured to engage the second groove.

21. The spectacles according to claim 13, wherein the fixing thread is between 1 cm and 25 cm, preferably between 3 cm and 20 cm long.

22. The spectacles according to claim 13, wherein the fixing thread has a diameter between 0.1 mm and 3 mm, preferably between 0.5 mm and 1.5 mm.

23. The spectacles according to claim 13, wherein the fixing thread is made of at least one of a monofilament and braided polymers such as at least one of polyamide, polyester, polyurethane and fluorocarbon.

24. The spectacles according to claim 13, wherein the spectacle frame further comprises a synthetic material, plastics, metal, aluminum, wood, titan, carbon, horn or a combination thereof.

25. A fixing thread for fixing a spectacle glass in a spectacle frame, the fixing thread comprising:
a first portion; and
a second portion,
wherein a first portion diameter of the first portion is larger than a second portion diameter of the second portion.

26. The fixing thread according to claim 25, wherein the first portion diameter is at least 1.5 times, preferably at least 2 times larger than the second portion diameter.

27. The fixing thread according to claim 25, wherein the first and second portions have essentially a same length.

28. The fixing thread according to claim 25, wherein the fixing thread is between 2 cm and 50 cm, preferably between 6 cm and 40 cm long.

29. The fixing thread according to claim 25, wherein the first portion diameter is between 0.1 mm and 3 mm, preferably between 0.5 mm and 1.5 mm.

30. The fixing thread according to claim 25, wherein the second portion diameter is between 0.05 mm and 2 mm, preferably between 0.2 mm and 1 mm.

31. The fixing thread according to claim 25, wherein the fixing thread is made of at least one of a monofilament and braided polymers such as at least one of polyamide, polyester, polyurethane and fluorocarbon.

32. A spectacle frame made of wood, horn or aluminum, the spectacle frame comprising:
   two receiving openings for spectacle glasses;
   a groove and a bar each directed towards the two receiving openings for each of the spectacle glasses; and
   at least two bores for guiding a fixing thread through the at least two bores.

33. A kit comprising:
   a spectacle frame made of wood, horn or aluminum and comprising two receiving openings for spectacle glasses, wherein the spectacle frame comprises for each of the spectacle glasses a groove and a bar each directed towards the receiving openings, and wherein at least two bores are provided for guiding a fixing thread through the at least two bores; and
   at least one fixing thread for fixing one of the spectacle glasses in the spectacle frame, wherein the at least one fixing thread comprises a first portion and a second portion and wherein a first portion diameter of the first portion is larger than a second portion diameter of the second portion.

* * * * *